March 8, 1966  E. W. YETTER  3,239,826
TRANSDUCER APPARATUS

Filed April 3, 1962  3 Sheets-Sheet 1

TRANSMITTER

RECEIVER AND BEAT
FREQUENCY OSCILLATOR

INVENTOR.
EDWARD W. YETTER
BY Harry J. McCauley
ATTORNEY

United States Patent Office 3,239,826
Patented Mar. 8, 1966

3,239,826
TRANSDUCER APPARATUS
Edward W. Yetter, West Chester, Pa., assignor to E. I. du Pont de Nemours and Company, Wilmington, Del., a corporation of Delaware
Filed Apr. 3, 1962, Ser. No. 184,742
8 Claims. (Cl. 340—195)

This invention relates to transducer apparatus, and particularly to a transducer apparatus responsive to temperature-pressure-magnetic field changes in a given environment. This application is a continuation-in-part of U.S. application S.N. 19,399, now abandoned and succeeded by application S.N. 244,794.

There are a very great number of situations wherein it is desirable to sense one or more of the conditions temperature, pressure and magnetic field, a typical one being that of logging these conditions for a space vehicle. Here the paramount requirements are for ruggedness, reliability, compactness and simplicity, and the transducer apparatus of this invention possesses all of these attributes to a high degree.

Figure 1:
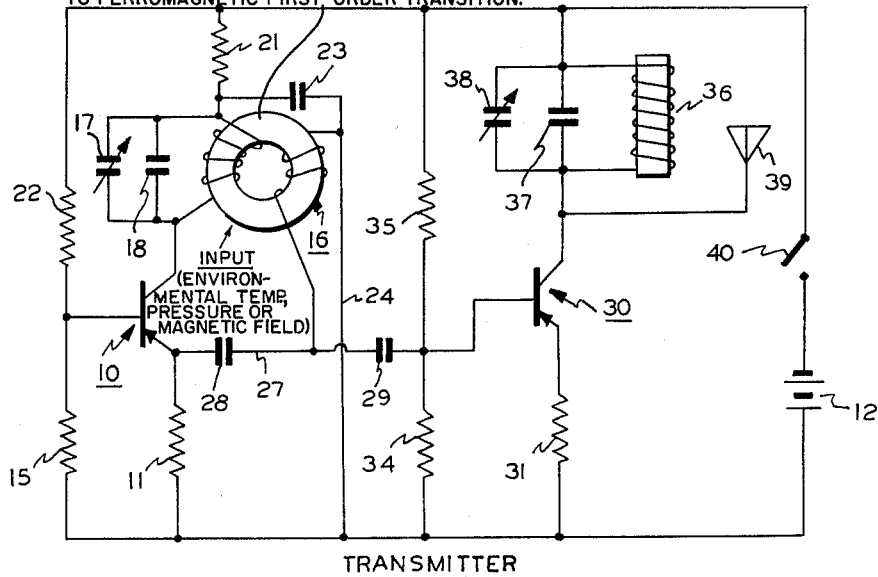
Figure 3:
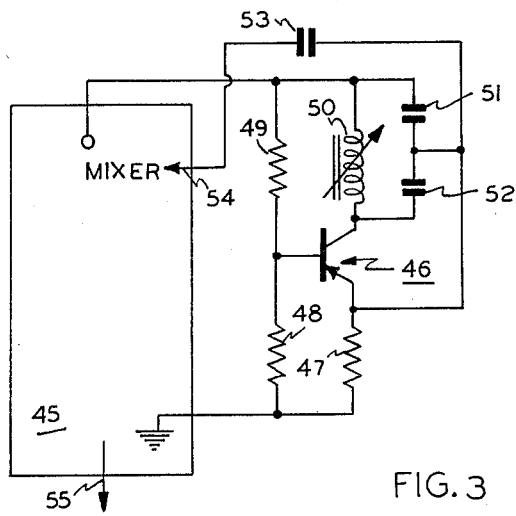
Figure 2:
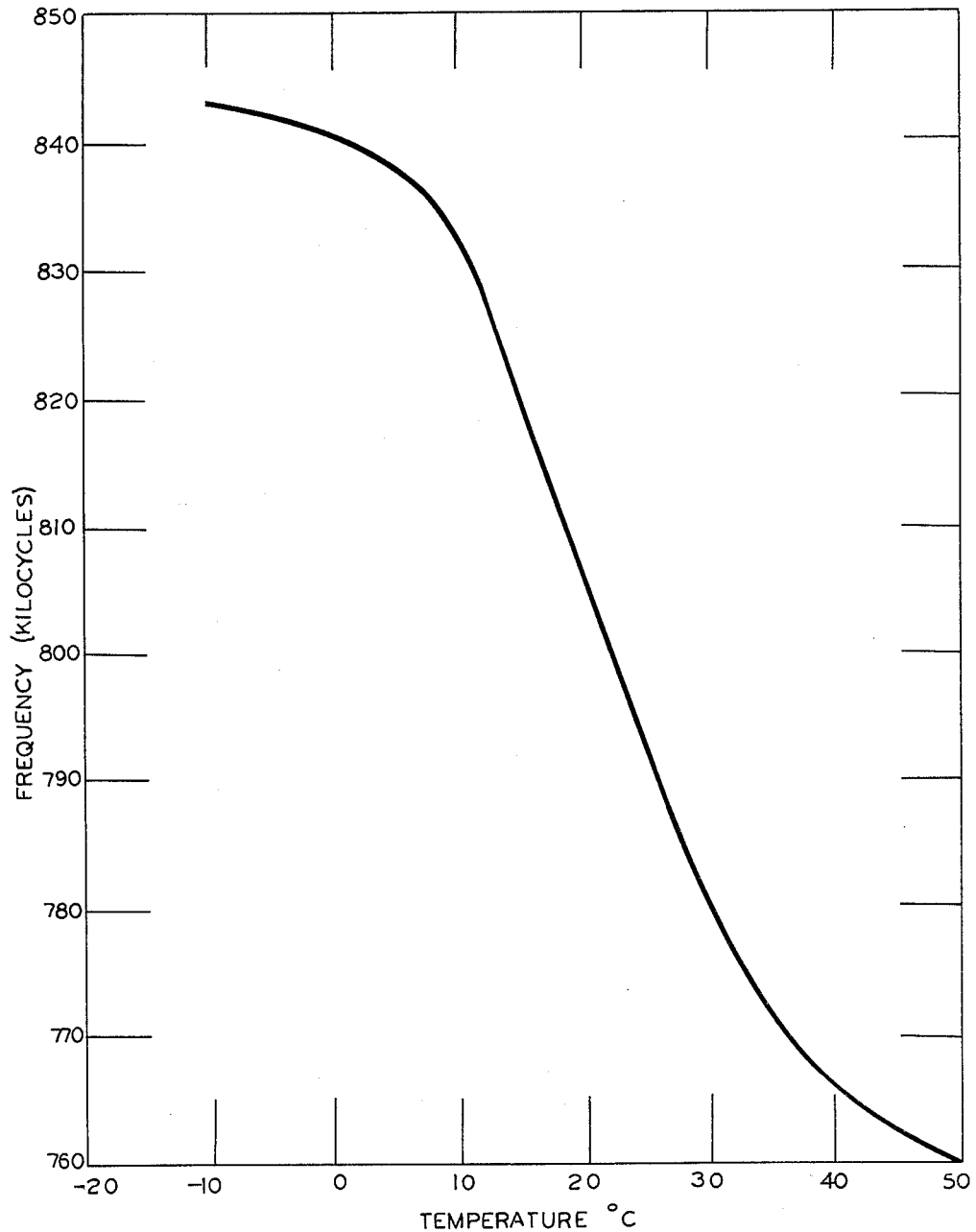
Figure 4:
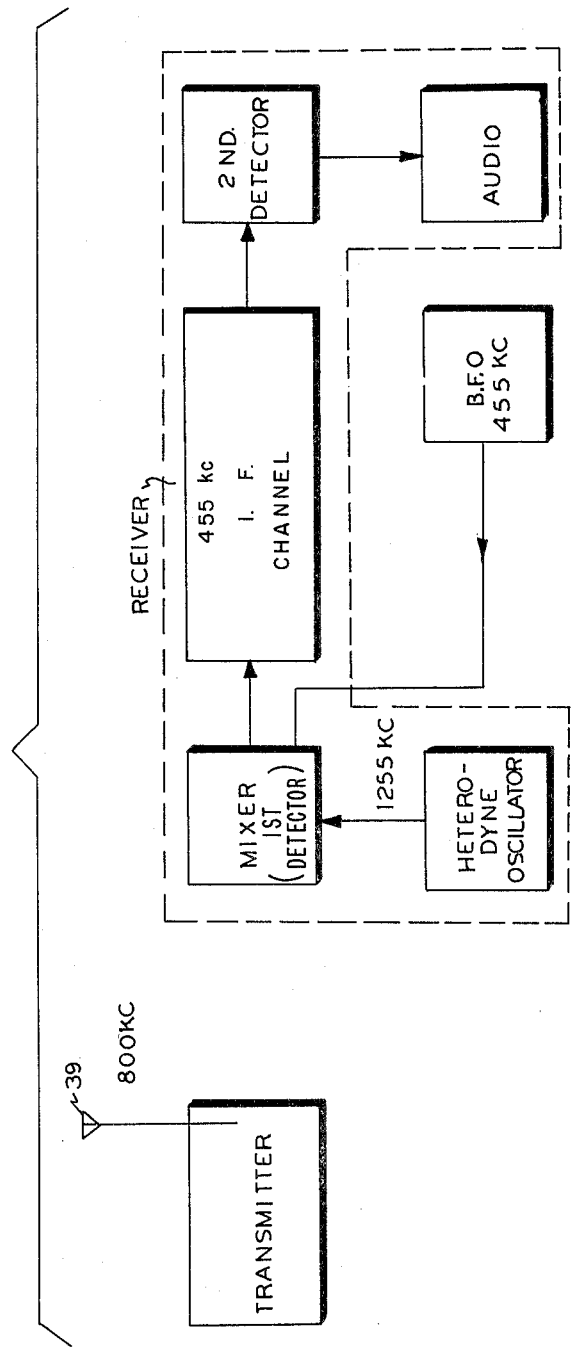

An object of this invention is, therefore, to provide an improved transducer apparatus particularly adapted to use under demanding conditions, such as those represented by space vehicles, the testing or monitoring of operation of electromagnetic machinery, harsh industrial environments, and the like. Other objects of this invention are to provide a transducer apparatus of high inherent accuracy, one which is economical in fabrication cost and maintenance, and one which possesses an extremely high reliability. The manner in which these and other objects of this invention are attained will become apparent from the following detailed description and the drawings, in which:

FIG. 1 is a schematic representation of one embodiment of transmitter according to this invention employing telemetering operation, FIG. 2 is a plot of temperature v. frequency for a typical oscillator employed in the transmitter of FIG. 1, FIG. 3 is a schematic representation showing a receiver for use in conjunction with the transmitter of FIG. 1, and FIG. 4 is a block diagram illustrative of the operation of the entire apparatus.

Generally, this invention comprises a temperature-pressure-magnetic field responsive transducer apparatus comprising an electrical inductor provided with a core consisting at least in part of a substance which displays a change in permeability with a change in temperature, pressure or magnetic field as accompaniment to the first-order transition from one solid state phase to a second solid state phase and an electrical conductor wrapped around the core, the core being exposed to the environment, evincing change in temperature, pressure and magnetic field, powering means in circuit with the inductor delivering an electrical current therethrough, and means responsive to the variance in the electrical current as a function of the inductance of the inductor indicative of the existing temperature-pressure-magnetic state of the environment.

Referring to FIG. 1, the transmitter of a preferred embodiment of the apparatus comprises a conventional transistor oscillator incorporating a transistor 10 (typically a type 2N1023) having its emitter connected through a coupling resistor 11 (typically 600 ohms) to the positive terminal of a D.C. power source 12 (typically a 15 v. battery, or the equivalent). Resistors 11, 15 (typically 1.5K ohms) and 22 (typically 22K ohms) constitute the bias network for transistor 10, the collector of which is connected to one winding of a closed core 16 inductor wherein the core consists at least in part of a substance which displays a change in permeability accompanying a first-order transition from one solid state phase to a second solid state phase, such as those taught in parent U.S. application Serial Number 19,399 and, in even greater detail, in U.S. application Serial Number 19,370 of T. J. Swoboda now abandoned and refiled as applications S.N. 181,629 (now U.S. Patent 3,126,492), directed to devices and 181,744 (now Patent 3,126,347) directed to compositions, respectively.

It should be stressed that the first-order transition is entirely distinct from the upper ferromagnetic transition temperature, i.e., the Curie point, which is usually in the range of 180° C. and above, for antimonide materials as described in U.S. Patents 3,126,492 and 3,126,347 supra. In fact, Curie points are considered to be second-order transitions in which energy and volume change continuously, but the temperature derivatives of these quantities have singularities (refer, "Phase Transformations in Solids," Symposium at Cornell University, August 23–28. 1948, John Wiley & Sons, Inc., New York, 1951, chapter I, by L. Tisza, pp. 1 and 2).

As described in the parent application, the substances employed as inductor core materials of fabrication are those possessed of the characteristic of changing in magnetic state with temperature from paramagnetic or antiferromagnetic on the one hand to ferromagnetic or ferrimagnetic on the other in the course of the first-order transition from one solid state phase to the second solid state phase. Moreover, the first-order transition is such that it can be induced to occur at preselected temperatures, within limits, by the application of compressive force to the material, as a result of which there occurs an alteration in the temperature response which is, for the antimonides hereinafter described, of a magnitude of about 2° C. per 15,000 lbs./sq. in. of compression in the direction of increasing temperature for the mid-point of the indication span. This property not only affords a means for small scale changes in characteristics as an aid in calibration by the use of pressure-loading set screws or the like, but also makes possible a response based on combined temperature-pressure interaction, provided, of course, that the contribution allocable to each agency is identifiable. The first order transition can also be induced at preselected temperatures within limits solely by the imposition of a magnetic field.

A first-order transition is always accompanied by a change in internal energy in the substance undergoing the transition, and this change is manifested by a latent heat, which, for the state in which the internal energy content is lowered, becomes available as a sensible heat for transfer by conduction and the other modes of heat transfer to an environment with respect to which a thermal gradient exists. Conversely, where the state past the transition point is such that the internal energy content is elevated, the substance seeks to absorb heat from its environment and will, accordingly, remove heat from an environment with respect to which a negative thermal gradient exists. Examination has revealed that the crystal symmetry is not changed when materials useful as inductor core materials according to this invention traverse the first order solid-phase-to-solid-phase transition.

Materials especially useful for fabrication of inductor cores employed in this invention are those described in greatest detail in said U.S. application Serial No. 19,370. These materials are comprised of at least two transition elements selected from the B families of Groups V–VII of the Periodic Table (refer. Deming "General Chemistry," John Wiley & Sons, Inc., 5th ed., chapter 11) i.e., vanadium, chromium, manganese, niobium, molybdenum, tantalum, tungsten and rhenium, in total amount of 35–95 atom percent, at least one of said transition elements being selected from the first row elements of said B families i.e., vanadium, chromium and manganese, and a total of from 5 to 40 atom percent of at least one element of Group V-A i.e., antimony, arsenic, bismuth, nitrogen and phosphorus, plus at least one of the elements of Groups II-IV hereinafter described, if required to fill out the composition to 100%, and have a maximum saturation induction at a temperature lying intermediate absolute zero and the Curie point. Such compositions are produced by heating mixtures of the elements in the desired proportions to temperatures between about 600–1050° C. Specific compositions containing 35–95 atom percent of the transition elements, with one said transition element being selected from the first row elements of said B families, and a total of from 5–40 atom percent of at least one element of Group V-A exhibit the first-order phase transition within a temperature range, e.g., absolute zero to +200° C., which is particularly desirable for a large number of applications. Compositions containing essentially four chemical elements have functioned well as inductor core materials. Such quaternary compositions usually contain 5–35 atom percent antimony, 35–70 atom percent manganese, 0.8–25 atom percent of at least one of the metals chromium and vanadium, and 0–30 atom percent of at least one of the elements of Groups II–IV of the Periodic Table, especially gallium, indium, cadmium, lead, thallium, tin, zirconium, scandium, yttrium, magnesium, and zinc, the percentages being so chosen as to total 100 percent.

The foregoing compositions are examples of materials which undergo a first-order solid-phase-to-solid-phase transition upon the application of a magnetic field, traversal of the transition under adiabatic conditions being, in this case, accompanied by a fall in temperature of the substances and a change from the non-magnetic to the magnetic state. However, yet other substances which meet the general requirements hereinbefore set forth for a core material are also useful. Thus, for example, materials which exhibit a first-order transition in the reverse sense, i.e., in going from a magnetic to a non-magnetic state with accompanying rise in temperature can also be employed. Representative of the latter type of material is manganese arsenide and, obviously, other substances having the delineated characteristics are efficacious for the purpose. The foregoing materials display a relatively high rate of change of magnetization with temperature as compared to all other known substances and thus are especially suited to the uses contemplated by this invention.

Other compositions which can be employed in fabrication of inductor cores according to the present invention contain manganese in an amount of at least 40 atom percent, a second metallic component selected from iron, cobalt, nickel, copper and zinc, in an amount of 0.6–25 atom percent, and at least one of arsenic, antimony and bismuth in an amount of 25–40 atom percent. Additional components selected from nitrogen, phosphorous and the elements of Groups III-A, III-B, IV-A and IV-B in an amount of 0–25 atom percent may also be present. These compositions are described more fully in application Ser. No. 66,194, filed Oct. 31, 1960 (now U.S. Patent 3,126,345) in the name of T. J. Swoboda.

Still other compositions useful in the present invention are described in application Ser. No. 66,195, filed Oct. 31, 1960 (now U.S. Patent 3,126,346) in the name of T. A. Bither. These compositions contain a single transition metal selected from vanadium, chromium, manganese, iron, cobalt, or nickel in an amount of 61–75 atom percent and from 25–39 percent of at least two elements selected from the class consisting of gallium, germanium, selenium, tellurium, arsenic, antimony, and bismuth of which at least the major atom percent consists of arsenic, antimony and/or bismuth.

As specific illustrations of the compositions described above may be mentioned manganese-chromium or manganese-vanadium antimonides which contain manganese in an amount of 53.5–91.9 atom percent, chromium and/or vanadium in an amount of 0.1–38.5 atom percent, and 8–35 atom percent of antimony (refer Swoboda application Ser. No. 125,511, filed July 20, 1961, now abandoned and succeeded by application S.N. 181,744 hereinbefore referred to). Certain of these compositions can be represented by the formula $Mn_{2-x}M_xSb$, where M is Cr or V and $x$ is 0.003–0.41. Manganese-chromium antimonide according to this formula exhibits a transition at room temperature, about 300° K., when $x$ is about 0.1.

Other particularly desirable compositions for use in the present invention are manganese-antimony arsenide and manganese-germanium antimonide containing 61–75 atom percent manganese, up to 20 atom percent arsenic or germanium, and the balance antimony. Further desirable compositions are manganese-cobalt antimonide, manganese-zinc antimonide, and iron-rhodium alloys. As hereinbefore indicated, the presence of additional elements in the composition may sometimes have a beneficial effect.

Permeability, $\mu$, is defined as $B/H$, where $B$=magnetic flux density and $H$=magnetic field intensity. Considering as an example the quaternary antimonides hereinbefore mentioned, the material, below transition temperature, is essentially non-magnetic with a permeability practically unity. As the material is heated, and the magnetization increases, the permeability increases to 20–30, or even higher. When the material is in its magnetic state, its behavior is similar to most well-known magnetic materials in that the permeability is effected by field strength, past magnetic and thermal history, and similar factors.

In an inductor provided with a core of magnetic material, the inductance L, can be expressed as follows:

$$L=KN^2\mu$$

where $L$=inductance in henries,
$N$=number of turns of conductor surrounding the core,
$\mu$=permeability of the magnetic core, and
$K$=a constant depending upon the geometry of the inductor.

Accordingly, where a magnetic core is employed with a permeability which is a function of temperature, $\mu=f(T)$, and the inductance then becomes $L=KN^2f(T)$ which, where the permeability function is linear, as here, becomes $L=KkN^2T$, where $k$ is also a constant.

The magnetic antimonides hereinbefore mentioned are magnetically anisotropic and thus have a preferred direction of magnetization which is substantially along the c-axis of single crystal material at temperatures above about −20° C., shifting, for example, to the a plane as Cr content increases at temperatures somewhat below this level, and lying substantially entirely in the a plane for all values of Cr at temperatures below about −50° C. It is, accordingly, advantageous to utilize these materials with orientation within the core such that the direction of the flux lines coincides substantially with the preferred direction of magnetization corresponding to the temperature of use. The described orientation can be readily accomplished by techniques known in the art, such as, for example, by aligning antimonide particles within a strong magnetic field and thereafter cementing them into a unitary mass with a suitable cement. However, it is preferred to utilize single crystals shaped to preselected dimensions by the use of "crystal pullers" or similar apparatus, since these possess the highest permeability values.

Referring again to FIG. 1, the tank circuit passive frequency determination network incorporates the closed core (toroidal) inductor of the oscillator, indicated generally at 16, provided with a primary (left-hand) winding (typically 350 turns) and a secondary (right-hand) winding (typically 25 turns), the primary winding being shunted by a trimming capacitor network comprising a variable capacitor 17 and a fixed capacitor 18 (typically 350 mmf.) connected in parallel one with the other. The circuit back to the base of transistor 10 is completed through a resistor 21 (typically 1.5K ohms) and the resistor 22 (hereinbefore described). The adjacent end of the secondary winding is connected to the primary winding through capacitor 23 (typically 0.01 mfd.) and to the positive side of power source 12 via lead 24, whereas the negative terminal of the secondary winding is connected to output lead 27, coupled to the emitter of transistor 10 by capacitor 28 (the latter completing the oscillation-sustaining regenerative feedback loop) and to the antenna circuitary by capacitor 29 (each capacitor typically 0.01 mfd.). It will be understood that resistor 21 and capacitor 23 together constitute a decoupling filter network for the oscillator.

The right side of the transmitter circuit is reserved to amplification and antenna connections, comprising an antenna isolation amplifier transistor (e.g., a 2N247 type) indicated generally at 30, having its emitter connected to the positive side of power source 12 through current-limiting resistor 31 (typically 470 ohms) and its base connected to the positive and negative sides of the source through resistors 34 (typically 10K ohms) and 35 (typically 33K ohms), respectively. Under these circumstances resistors 31, 34 and 35 together constitute a biasing network for transistor 30, which latter is provided in the collector circuit with a tuned L–C network inclusive of antenna 39. This L-C network incorporates as load impedance ferrite core inductor 36 (typically 250 μh.) connected in parallel with fixed capacitor 37 (typically 100 mmf.) and variable capacitor 38 (typically 50–350 mmf. range), which tuned network is connected between the collector element of transistor 30 and the negative side of power source 12. Coupling to the antenna 39 is taken directly from the collector of transistor 30. Finally, the transmitter circuit is completed by a switch 40 interposed in the common negative supply lead for all of the components hereinbefore described.

Turning now to FIG. 3, the receiver comprises a standard radio receiver, indicated generally at 45, which can be a low-cost portable type such as a Toshiba Model 7TF–3525 incorporating its own heterodyne oscillator (not detailed). This receiver is provided with a beat frequency oscillator auxiliary comprising transistor 46 (typically 2N469) having its emitter and base connected to the receiver ground, the former through resistor 47 (typically 4.7K ohms) and the latter through resistor 48 (typically 10K ohms). The base element of transistor 46 is also connected through resistor 49 (typically 33K ohms) to the negative (−9 v.) terminal of receiver 45, and the transistor collector is connected to the same terminal through the oscillator tank circuit. From the foregoing, it is apparent that resistors 47, 48 and 49 together constitute a biasing network for transistor 46. The latter comprises a tunable ferrite core inductor 50 (typically a 455 kc. intermediate frequency coil) connected in parallel with series-connected capacitors 51 and 52 (each typically 150 mmf.). Finally, the emitter of 46 and the mid-capacitor point of the tank circuit are capacitor-coupled through 53 (typically 250 mmf.) to the base of the mixer transistor receiver, which connection 54, is indicated only schematically in the drawing. Frequency indication can be either on the basis of the sound emitted from receiver 45, or a signal can be withdrawn via lead 55 applicable to a conventional frequency meter (not detailed) where visual indication is desired.

In the typical apparatus hereinbefore described, the core of inductor 16 was a chromium-manganese antimonide having the composition (in terms of weight percent) of: 45.40% Mn, 50.02% Sb, 2.10% Cr, and 2.48% In. The antimonide core had the dimensions ½″ O.D. x ⁹⁄₁₆″ I.D. x ⅛″ thick. For the geometry and circuit components detailed, the transmitter output frequency was in the vicinity of 0.8 mc., or 800 kc. Using temperature solely as the variable, the signal output frequency varied from 760 kilocycles to about 843 kilocycles for a corresponding environmental temperature variance from −10° C. to +50° C., the performance being plotted in FIG. 2.

The operation of the apparatus is in accordance with the block diagram of FIG. 4. Here all the elements integral with receiver 45 are shown within the broken line enclosure, whereas the beat frequency oscillator (denoted B.F.O.) is represented as an external auxiliary. A typical frequency of beat oscillation with the circuit hereinbefore described is 455 kc., and operation is described with this numerical value assumed.

If it is also assumed that the normal or reference frequency of the transmitter is 800 kc. (corresponding to 24° C., FIG. 2), as hereinbefore mentioned, then an output signal of 800 kc. is transmitted via antenna 39. Under these circumstances, the heterodyne oscillator of the receiver will have to be adjusted to deliver precisely 1255 kc., so that the different between this frequency and the carrier wave frequency of 800 kc. will be equal to the intermediate frequency of 455 kc.

The receiver mixer (which is also the first detector stage) delivers as output the difference between the heterodyne oscillator frequency and the carrier frequency. When the beat frequency oscillator 455 kc. output is superposed, the signal band delivered to the intermediate frequency channel (tuned to a relatively broad band to either side of 455 kc.) furnishes a beat signal at the second detector stage which, when the two signals become equal, constitutes a zero beat signal delivered to the audio stage of the receiver.

Now if the temperature of the environment to which transducer inductance 16 is exposed falls to 23.7° C., corresponding to 800.5 kc. signal output of the transmitter, the combined signal of the heterodyne oscillator and the transmitter then yields a 454.5 kc. signal at the first detector and this, with 455 kc. signal from the beat frequency oscillator, yields a 500 cycle beat signal delivered by the second detector stage, and thence to the receiver audio stage. Thus, a characteristic response frequency is generated as a function of the temperature to which inductor 16 is exposed. The signal is equally useful in determining magnetic field and pressure individually, when the contribution of temperature is either zero or compensated by an independent detector for temperature solely, or for the combination effect of two or even all three parameters, if this is the condition of interest.

The apparatus hereinbefore detailed had a frequency swing of 1500 cycles/sec./° C. change in temperature of the core of inductor 16. This was more than adequate to provide full-scale deflection of a read-out frequency meter for a 10° C. change in core temperature. In general, a total frequency shift of about 5% is obtained when a core fabricated from an antimonide of composition hereinbefore described passes from completely antiferromagnetic to completely ferrimagnetic. If this change occurs responsive to a temperature change of, for example, 33° C., the frequency change corresponds to 0.15%/° C. At one megacycle, this corresponds to 1500 c./° C., whereas at ten megacycles the change is 15,000 c./° C. At one megacycle it is entirely practicable to press a toroidal coil core directly from powdered antimonide material, but at higher frequencies (e.g., up to 10 megacycles) it is desirable to provide non-conductive cores, as by grinding the antimonide to a fine powder and embedding it in a suitable binder, such as an epoxy resin.

Using the same apparatus as hereinbefore described in detail, with receiver, however, tuned to a different level at start-up, the following test was conducted at room temperature in measurement of magnetic field solely. Inductor 16 was placed within the coil of a 12″ long solenoid of an adjustable calibrated electromagnet as magnetic field source a distance of about 2″ inwardly along the coil axis and the receiver located about 10 ft. distant.

To facilitate the measurement of receiver beat frequency, the latter was displayed as the y-component on an oscilloscope screen against a calibration frequency as the x-component, adjusted to produce an elliptical Lissajous figure. The specific frequencies corresponding to given magnetic field strengths were as follows, the cumulative change in frequency being also given over the range of frequencies evaluated:

| Field (oersteds) | Frequency (cycles/sec.) | Cumulative Change in Frequency (cycles/sec.) |
| --- | --- | --- |
| 0 | 2,100 | 0 |
| 850 | 1,660 | 440 |
| 1,200 | 1,400 | 700 |
| 1,700 | 880 | 1,220 |

The carrier frequency shift telemetering circuit described in detail herein is only one way in which inductance change resulting from change in permeability of a magnetic transition material can be used as a pressure-temperature-magnetic field indicator. Other methods can utilize the inductance change to vary the frequency of amplitude modulation of a fixed high frequency carrier; or to vary the pulse width or pulse repetition rate of a pulse modulated carrier; or to vary the frequency of modulation of a frequency modulated carrier. In all these methods frequency changes are readily obtained by change in resonance of an L-C circuit in the same or similar manner to that described for the detailed embodiment of this invention. Thus, pulse repetition rate modulation can be obtained from a frequency modulated sine wave by clipping, differentiating, rectifying, and using the resultant pulse train to modulate a high frequency carrier. Similarly, pulse width modulation can be effected by using an antimonide core inductor to determine the relaxation time of a "one-shot" multivibrator, which, in turn, can be driven from a constant frequency source.

Yet other methods of obtaining a characteristic signal either through telemetry or direct wire transmission are well within the skill of the art. Thus, antimonide can be used in the core of a differential transformer to yield an unbalance as a function of temperature or the other parameters, pressure or magnetic field. This unbalance can be rectified to yield a direct current proportional to the parameter, or used directly as an alternating current whose magnitude is a function of the parameter. In another variation, an antimonide core can be employed to link two coils, thus yielding a transformer whose mutual coupling is parameter-responsive.

From the foregoing, it is apparent that my invention comprises a temperature-pressure-magnetic field responsive transducer which can be modified in numerous ways within the skill of the art without departure from its essential spirit, and it is accordingly intended to be limited only within the scope of the following claims.

I claim:

1. A transducer apparatus responsive to temperature, pressure and magnetic field comprising an electrical inductor provided with a core consisting at least in part of a substance having a Curie point at a predetermined temperature and which displays a change in permeability with retention of crystal symmetry below that temperature characterized in that the magnetic state reverts from paramagnetic or antiferromagnetic on the one hand to ferromagnetic or ferrimagnetic on the other concomitant with a first order transition from one solid state phase to a second solid state phase and an electrical conductor wrapped around said core, said core being exposed to the environment evincing change in temperature, pressure and magnetic field, powering means in circuit with said conductor delivering an electrical current therethrough, and means responsive to the variance of said electrical current as a function of the inductance possessed by said inductor in traversal of said first-order transition for indicating the variation in existing temperature, pressure, and magnetic field state of said environment 2. A transducer apparatus responsive to temperature, pressure and magnetic field comprising an electrical inductor in which an electrical conductor is wrapped around a core fabricated from a substance having a Curie point at a predetermined temperature and which displays a change in permeability with retention of crystal symmetry below that temperature characterized in that the magnetic state reverts from paramagnetic or antiferromagnetic on the one hand to ferromagnetic or ferrimagnetic on the other concomitant with a first-order transition from one solid state phase to a second solid state phase consisting essentially of antimony in the amount of 5-35 atom percent, at least two elements selected from the group consisting of vanadium, chromium, manganese, niobium, molybdenum, tantalum, tungsten and rhenium, at least one of which latter elements is selected from the sub-group consisting of vanadium, chromium and manganese, in the amount of 35-95 atom percent, and not in excess of 30 atom percent of an element selected from the group consisting of cadmium, gallium, indium, lead, magnesium, scandium, thallium, tin, yttrium, zinc and zirconium, said core being exposed to the environment evincing change in temperature, pressure and magnetic field, powering means in circuit with said electrical conductor delivering an electrical current therethrough, and means responsive to the variance of said electrical current as a function of the inductance possessed by said inductor intraversal of said first-order transition for indicating the variation in existing temperature, pressure, and magnetic field state of said environment.

3. A transducer apparatus responsive to temperature, pressure and magnetic field according to claim 1 wherein said core consists in part of a material having a permeability which is substantially invariant with temperature and in part of a substance which displays a change in permeability accompanying said first-order transition from one solid state phase to a second solid state phase.

4. A transducer apparatus responsive to temperature, pressure and magnetic field according to claim 1 wherein said core is substantially closed in form.

5. A transducer apparatus responsive to temperature, pressure and magnetic field comprising an electrical inductor in which an electrical conductor is wrapped around a core fabricated from a substance having a Curie point at a predetermined temperature and which displays a change in permeability with retention of crystal symmetry below that temperature characterized in that the magnetic state reverts from paramagnetic or antiferromagnetic on the one hand to ferromagnetic or ferrimagnetic on the other concomitant with a first-order transition from one solid state phase to a second solid state phase consisting essentially of at least one element selected from the group consisting of antimony, arsenic, bismuth nitrogen and phosphorus in the amount of 5-35 atom percent, at least two elements selected from the group consisting of vanadium, chromium, manganese, niobium, molybdenum, tantalum, tungsten and rhenium, at least one of which latter elements is selected from the sub-group consisting of vanadium, chromium and manganese, in the amount of 35-95 atom percent, and not in excess of 30 atom percent of an element selected from the group consisting of cadmium, gallium, indium, lead, magnesium, scandium, thallium, tin, yttrium, zinc and zirconium, said core being exposed to the environment evincing change in temperature, pressure and magnetic field, powering means in circuit with said electrical conductor delivering an electrical current therethrough, and means responsive to the variance of said electrical current as a function of the inductance possessed by said inductor in traversal of said first-order transition for indicating the variation in existing temperature, pressure, and magnetic state of said environment.

6. A temperature telemetering apparatus comprising, in combination, (1) a transmitter provided with a signal generating circuit incorporating a temperature-responsive transducer provided with an inductor having a core consisting of a substance having a Curie point at a predetermined temperature and which displays a change in permeability with retention of crystal symmetry below that temperature characterized in that the magnetic state reverts from paramagnetic or antiferromagnetic on the one hand to ferromagnetic or ferrimagnetic on the other concomitant with a first-order transition from one solid state phase to a second solid state phase and an electrical conductor wrapped around said core, said core being exposed to the environment evincing change in temperature, powering means in circuit with said conductor delivering an electrical current through said conductor, and means responsive to a variance of said electrical current as a function of the inductance of said inductor modulating the output of said signal generating circuit in indication of a variation of the temperature level of said environment, and (2) receiver remote from said transmitter adapted to receive the output signal of said transmitter.

7. A pressure telemetering apparatus comprising, in combination, (1) a transmitter provided with a signal generating circuit incorporating a pressure-responsive transducer provided with an inductor having a core consisting of a substance having a Curie point at a predetermined temperature and which displays a change in permeability with retention of crystal symmetry below that temperature characterized in that the magnetic state reverts from paramagnetic or antiferromagnetic on the one hand to ferromagnetic or ferrimagnetic on the other concomitant with a first-order transition from one solid state phase to a second solid state phase and an electrical conductor wrapped around said core, said core being exposed to the environment evincing change in pressure, powering means in circuit with said conductor delivering an electrical current through said conductor, and means responsive to a variance of said electrical current as a function of the inductance of said inductor modulating the output of said signal generating circuit in indication of a variation of the pressure level of said environment, and (2) a receiver remote from said transmitter adapted to receive the output signal of said transmitter.

8. A magnetic field telemetering apparatus comprising, in combination, (1) a transmitter provided with a signal generating circuit incorporating a magnetic field-responsive transducer provided with an inductor having a core consisting of a substance having a Curie point at a predetermined temperature and which displays a change in permeability with retention of crystal symmetry below that temperature characterized in that the magnetic state reverts from paramagnetic or antiferromagnetic on the one hand to ferromagnetic or ferrimagnetic on the other concomitant with a first-order transition from one solid state phase to a second solid state phase and an electrical conductor wrapped around said core, said core being exposed to the environment evincing change in magnetic field, powering means in circuit with said conductor delivering an electrical current through said conductor, and means responsive to a variance of said electrical current as a function of the inductance of said inductor modulating the output of said signal generating circuit in indication of a variation of the magnetic field strength of said environment, and (2) a receiver remote from said transmitter adapted to receive the output signal of said transmitter.

References Cited by the Examiner

UNITED STATES PATENTS

| 1,586,877 | 6/1926 | Buckley | 340—196 |
| 2,991,414 | 7/1961 | Tillman | 324—43 |

OTHER REFERENCES

Yhap: IBM Technical Disclosure Bulletin, vol. 2, No. 5, February 1960, pp. 59, 60.

NEIL C. READ, *Primary Examiner.*

THOMAS B. HABECKER, *Examiner.*